United States Patent [19]
Perkins

[11] Patent Number: 5,698,828
[45] Date of Patent: Dec. 16, 1997

[54] DRIVER SIDE AIR BAG COVER WITH OPTICAL HORN SWITCH

[75] Inventor: Derek Perkins, Farmington Hills, Mich.

[73] Assignee: AlliedSignal Inc., Morristown, N.J.

[21] Appl. No.: 558,302

[22] Filed: Nov. 15, 1995

[51] Int. Cl.⁶ .................. H01H 9/00; H01H 35/00; G02B 6/00; G01L 1/24
[52] U.S. Cl. .................. 200/61.54; 200/61.02; 250/227.11; 280/728.1; 385/13
[58] Field of Search .................. 200/61.54–61.57, 200/61.02; 280/727–735; 250/551, 227.11; 385/13, 15–23, 143

[56] References Cited

U.S. PATENT DOCUMENTS

| | | | |
|---|---|---|---|
| 4,672,214 | 6/1987 | Takahashi et al. | 250/551 |
| 4,830,461 | 5/1989 | Ishiharada et al. | 385/13 |
| 5,423,569 | 6/1995 | Reighard et al. | 280/731 |

*Primary Examiner*—J. R. Scott
*Attorney, Agent, or Firm*—Markell Seitzman

[57] ABSTRACT

An air bag deployment door with a switch to activate a horn, the switch including a thin, flexible optical cable operatively disposed on or within the horn activation area and a sensor responsive to a change in signal strength through the cable for generating an activation signal to energize a horn.

13 Claims, 2 Drawing Sheets

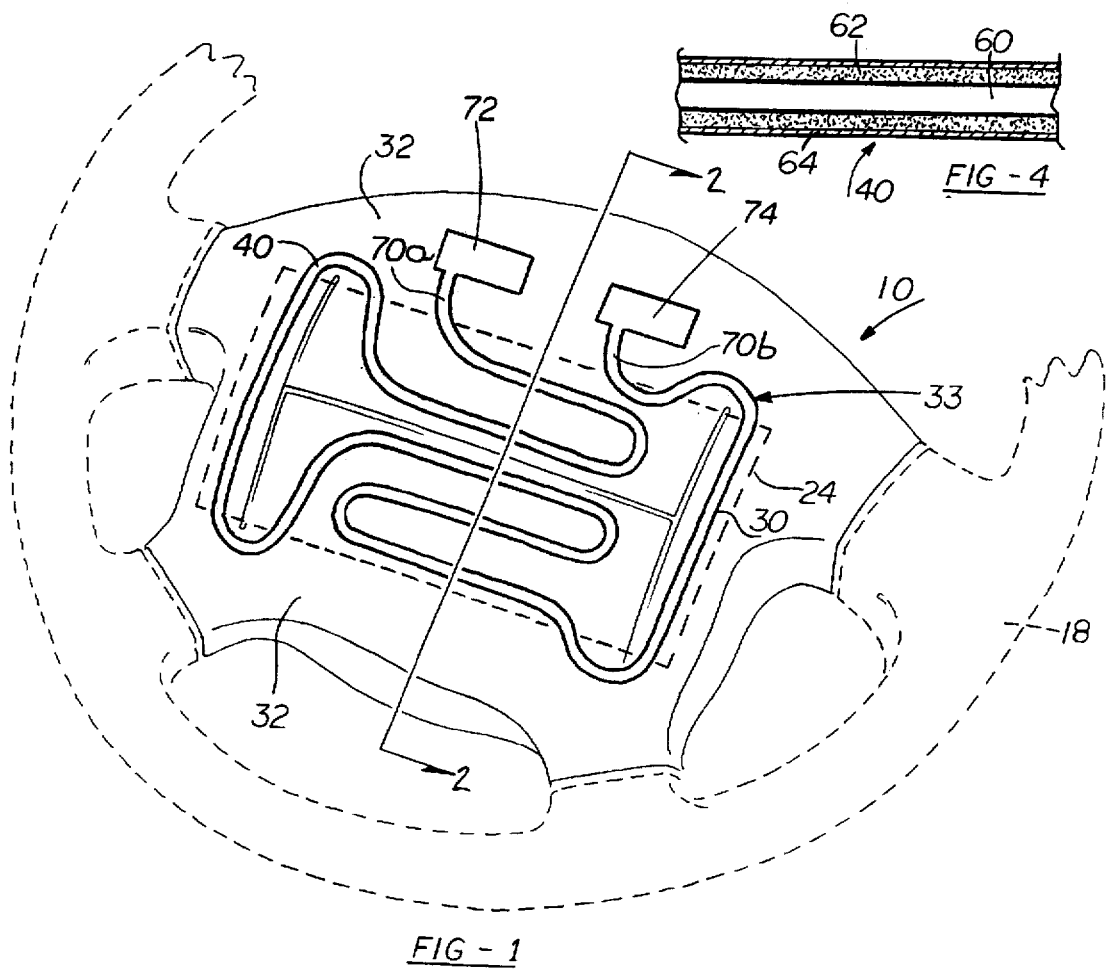
FIG - 1
FIG - 4
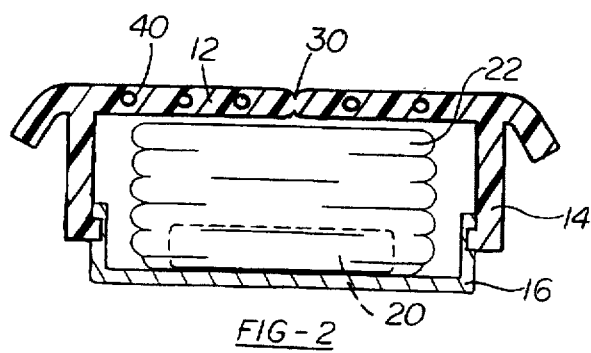
FIG - 2
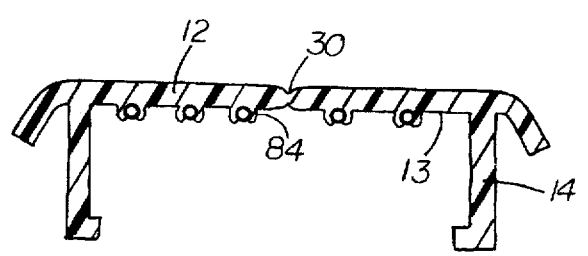
FIG - 5

DRIVER SIDE AIR BAG COVER WITH OPTICAL HORN SWITCH

BACKGROUND AND SUMMARY OF THE INVENTION

This invention relates to motor vehicle safety devices and more particularly to a driver side air bag deployment door or cover having an integral horn switch.

In many air bag deployment door configurations the previously used center mounted horn switch has been eliminated and the horn switch relocated within the spokes of the steering wheel. This placement provides a source of inconvenience for the driver. Some driver air bag modules provide an installation in which the entire module is movably mounted to actuate a closely spaced switch. The deficiency in the moving housing design is that the complexity of the system is increased. A central mounted horn switch has also been achieved by utilizing a membrane type switch mounted between two thin plastic sheets having conductive coatings as shown in U.S. Pat. No. 5,369,232. Membrane switches are typically temperature dependent and installation is complicated.

It is an object of the present invention to provide an air bag deployment door having a horn switch.

Accordingly the invention comprises: an apparatus comprising: a horn activation area deformable in response to a pushing force thereon; a thin, flexible signal carrying conduit operatively disposed on or within the horn activation area; first means responsive to a change in signal strength through the conduit for generating an activation signal to energize a horn. In the preferred embodiment of the invention the conduit is a flexible fiber optic cable in which a an LED functions as a light source and a phototransistor is used to sense the strength of the light transmitted through the cable.

Many other objects and purposes of the invention will be clear from the following detailed description of the drawings.

BRIEF DESCRIPTION OF THE DRAWINGS

In the drawings:

FIGS. 1 and 2 illustrate the preferred embodiment of the present invention.

FIG. 4 is a cross-sectional view through a fiber optic cable.

FIG. 5 shows an alternate embodiment of the invention.

DETAILED DESCRIPTION OF THE DRAWINGS

Figure 3:
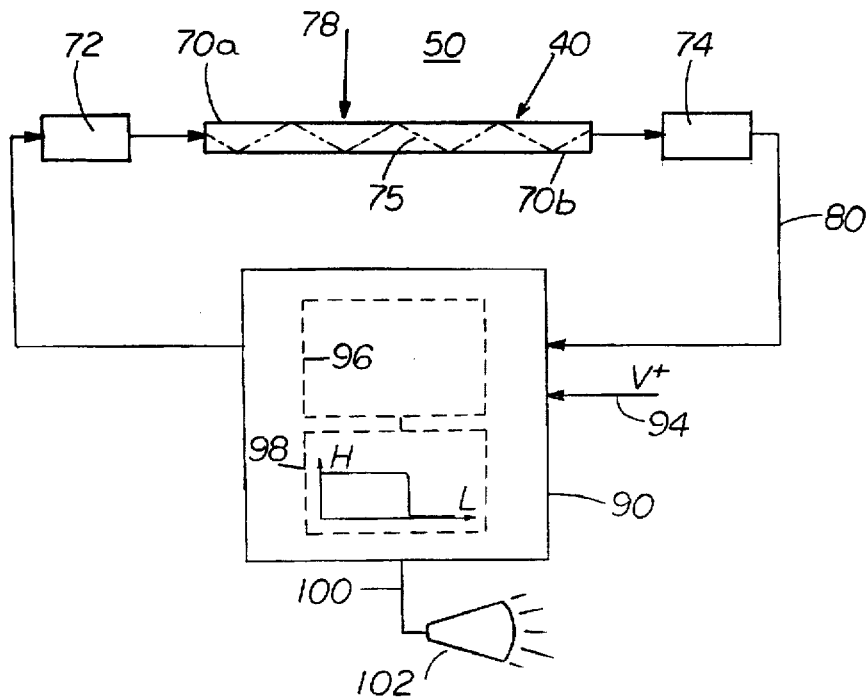
FIG. 3 illustrates a block diagram showing the principle of operation of the present invention.

Reference is made to FIGS. 1 and 2 which illustrate a driver side air bag cover or door 10 having a flexible top 12 and a plurality of sides 14 adapted to be attached to a housing 16 (see FIG. 2). As is known in the art this type of door is typically made of plastic or a reinforced flexible material. The housing is typically mounted to the central hub of a steering wheel 18 (shown in phantom line). The sides 14 are attached to the housing in any of a known number of ways. Shown within the housing is an inflator 20 and a folded air bag 22. Identified on the door's top 12 is a horn activation area generally shown by the dotted line 24. The top 12 also includes a tear seam 30 which is opened by the expanding air bag 22 causing parts of the door or cover 10 to rotate about integrally formed hinge portions 32. As illustrated the tear seam 30 has an "H" pattern. Other types of patterns such as a "U" or an "T" may be employed. The cover 10 includes a switch mechanism 33 positioned within the horn activation area 24. In this preferred embodiment of the invention this switch mechanism 33 includes a flexible fiber optic cable 40 that traverses the horn activation area. FIG. 2 shows that the cable 40 may be insert molded as an integral part of the door 10. As illustrated the cable 40 is bent at a number of locations. It should be noted that any of the bends or curves in the cable should not be severe enough to restrict the transmittance of light (see arrow 75) through the fiber optic cable. Additionally, to provide for a safe design, the cable should not cross any part of the tear seam 30 nor be positioned in a way to interfere with the deployment of the air bag.

FIG. 5 illustrates an alternate embodiment of the invention in which the underside 13 of the top 12 of the air bag is fabricated with a plurality of integrally molded snaps or clamps 84 into which the fiber optic cable 40 is positioned and thereafter secured such as by heat staking.

FIG. 3 illustrates a general layout of a fiber optic cable system 50 to be used in conjunction with the cable within the cover 10. In the preferred embodiment of the invention the cable is a flexible optical pressure sensitive cable such as the Ornes™ (elastomeric optical fiber pressure sensor) sold by Bridgestone. As illustrated in FIG. 4 the cable 40 comprises a high refractive silicone rubber core 60 surrounded by a rubber sleeve 62 of a low refractive silicone rubber. This sleeve 62 is covered by an outer sheath 66 of fluorinated rubber.

The system 50 includes a signal generator such as a light emitting diode 72 (LED), secured to one end such as 70a of the cable 18, which generates an optical signal 74 of predetermined strength. Secured to the cable end 70b is a signal receiver or detector 76 such as a phototransistor 76. Light emitted from the LED 72 is detected by the phototransistor. When the cover (or cable 40) is not bent, light (L) is transmitted through the cable 40 without degradation as illustrated in FIG. 3. When a pressure (see arrow 78), such as that applied by the vehicle driver, is applied to the cover 10 the cover and molded or attached cable are deformed or bent reducing the amount of transmitted light received at the detector 76. As described below, this reduction in transmittance is used to generate a signal (H) to activate a horn. The output of the phototransistor 72 is connected via wires 80 to a discriminator circuit 90 which also receives power from the vehicle's electrical system 92. The discriminator circuit or a separate circuit functions to apply this power to the LED 72 through wires 94. The discriminator circuit 90 may include buffering, conditioning and amplifying circuitry 96 and a signal level determining circuit 98. The signal level determining circuit 98 prevents the generation of a horn activation or output signal 100 to activate a horn 102 when the output of the phototransistor is above a preset amplitude level or below the preset level for only transient periods. By using such a signal level discriminator, the system can discriminate against spurious or transient inputs. Further as the present system is configured to generate a horn activation signal when the signal strength reduces it is appropriate to also include within the discriminator circuit a fault identification feature to disable the horn in the event of a malfunctioning LED, phototransistor or open circuit in the cable. Each of these malfunctions would reduce the level of light transmitted or received and may be interpreted as a condition to energize the horn. To prevent the continued operation of the horn the discriminator circuit 98 will also include means for determining the length of time the output of the phototransistor 76 is below the level at which the horn activation signal is to be generated. If this signal is present for a substantial period the horn is automatically deactivated. The system can periodically be returned to its normal mode of operation and if the low level of phototransistor is detected the horn can again be deactivated. Whenever the horn is deactivated the system shall also generate a signal to inform the driver that the car needs to be serviced.

Figure 7:
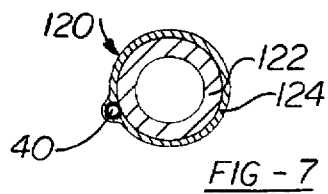
FIGS. 6 and 7 show another embodiment of the invention.
Figure 6:
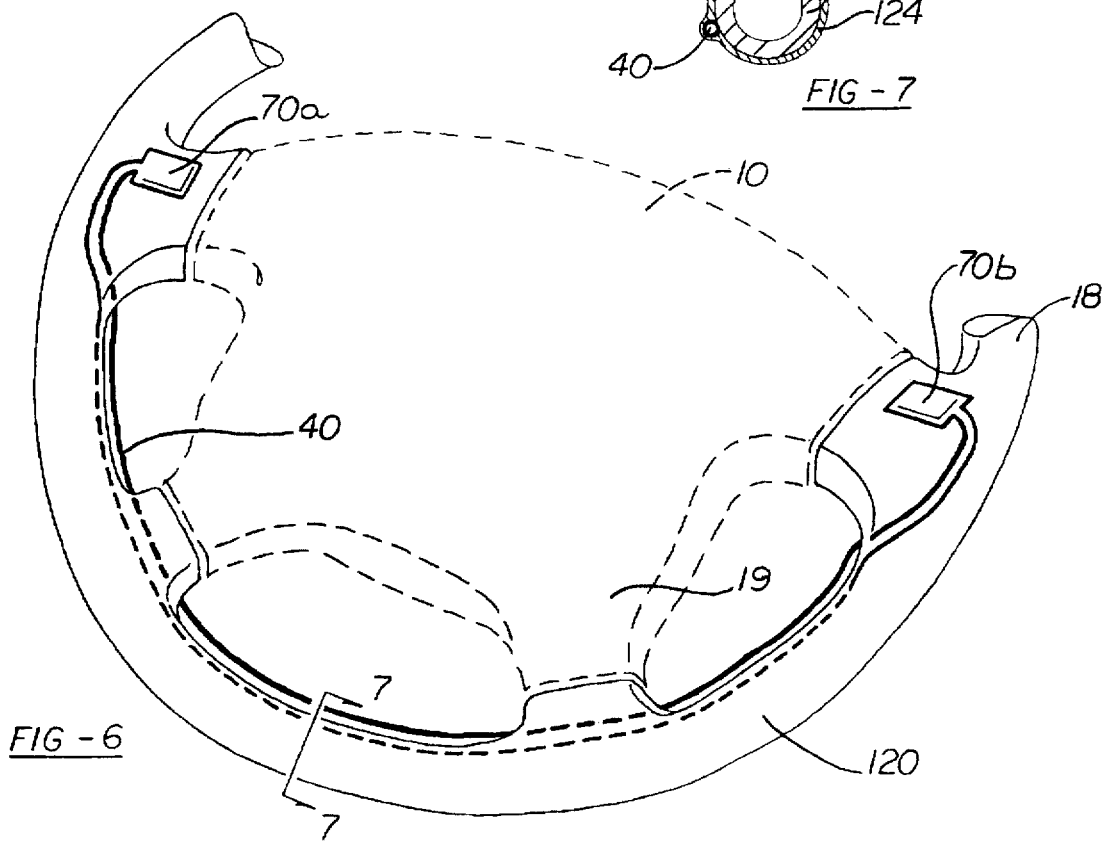

FIGS. 6 and 7 show an alternate embodiment of the invention. FIG. 5 illustrates a typical driver air bag installation, almost identical to that shown in FIG. 1, showing the steering wheel 18, spokes 19 and cover or door 10. In this embodiment of the invention the cable 40 is not located within the cover 10 but molded as part of the rim 120 of the steering wheel. FIG. 6 shows a cross-sectional view through section 6—6 of FIG. 5 and shows the typical construction of a steering wheel. The illustrated steering wheel includes a hollow metal tubular core 122 covered by a leather or elastomeric sheath 124. The cable 40 is mounted to an inner wall 126 of the rim 120 and secured by a thin, flexible section of the sheath 124. The ends of the cable 70a and 70b are connected to a circuit such as the one shown in FIG. 3. The horn is activated as the driver squeezes the sheath compressing the cable 40 to change the signal strength transmitted therethrough.

Many changes and modifications in the above described embodiment of the invention can, of course, be carried out without departing from the scope thereof. Accordingly, that scope is intended to be limited only by the scope of the appended claims.

I claim:

1. A cover comprising:

a horn activation area (24) deformable in response to a pushing force thereon;

a thin, flexible signal carrying conduit (40) having flexible walls, operatively disposed on or within the cover within the horn activation area and movable therewith, wherein that flexure of the conduit can modify the strength or signal level of a signal flowing therethrough;

first means (76,90) responsive to a change in signal strength through the conduit for generating an activation signal to energize a horn (102).

2. The device as defined in claim 1 wherein the first means (72) includes a signal generator means for providing a signal of a determinable strength or signal level to the conduit and a signal receiver (76) means for receiving the signal.

3. The cover (10) as defined in claim 2 further including at least one tear seam (30) which opens in response to the inflation of an air bag (22), such seam being remote from the conduit.

4. A cover for a driver side air bag comprising:

a horn activation area (24) deformable in response to a pushing force thereon;

a thin, flexible signal carrying conduit (40) operatively disposed on or within the cover within the horn activation area;

first means (76,90) responsive to a change in signal strength through the conduit for generating an activation signal to energize a horn (102) including a signal generator for impressing a signal upon the conduit and a signal receiver (76) for receiving the signal as it leaves the conduit and wherein the flexure of the conduit modifies the strength of the signal transmitted therethrough.

wherein the signal generator includes a transmitting means for generating light, the signal receiver includes receiving means for receiving the generated light and the conduit is an optical conduit.

5. An apparatus comprising:

a horn activation area deformable in response to a pushing force thereon;

a thin, flexible signal carrying conduit (40) operatively disposed on or within the apparatus within the horn activation area;

first means (76,90) responsive to a change in signal strength through the conduit for generating an activation signal to energize a horn (102) including a signal generator and a signal receiver (76) and wherein the flexure of the conduit modifies the strength of the signal transmitted therethrough;

wherein the apparatus is a steering wheel (18) and wherein the conduit is disposed proximate a surface thereof.

6. The device as defined in claim 4 wherein the generating means is a light emitting diode and wherein the receiving means is a phototransistor.

7. The device as defined in claim 4 wherein the conduit is positioned within a flexible top portion of the cover.

8. The device as defined in claim 4 wherein the conduit is attached to an under surface of the cover.

9. The device as defined in claim 4 wherein the first means includes signal level determining means for preventing horn activation when an output signal of the receiving means is below a preset level.

10. The device as defined in claim 9 wherein the signal level determining means is operative to prevent horn activation when such output signal is below the preset level for transient periods of time.

11. The device as defined in claim 4 including means for preventing horn activation upon sensing a malfunction in the conduit, receiving means or transmitting means.

12. The device as defined in claim 5 wherein the conduit is disposed adjacent a rim of the steering wheel, to be gripped and flexed by a driver of the vehicle.

13. The device as defined in claim 4 wherein the cover includes at least one tear seam (30) which opens in response to the inflation of an air bag (22), such seam being remote from the conduit.

* * * * *